United States Patent
Lin

(10) Patent No.: US 11,103,745 B2
(45) Date of Patent: Aug. 31, 2021

(54) EXERCISE DISC FOR STRENGTHENING THE FINGERS

(71) Applicant: Yiming Lin, Berlin (DE)

(72) Inventor: Yiming Lin, Berlin (DE)

(*) Notice: Subject to any disclaimer, the term of this patent is extended or adjusted under 35 U.S.C. 154(b) by 34 days.

(21) Appl. No.: 16/314,397

(22) PCT Filed: Aug. 22, 2017

(86) PCT No.: PCT/DE2017/000271
§ 371 (c)(1),
(2) Date: Dec. 29, 2018

(87) PCT Pub. No.: WO2018/036577
PCT Pub. Date: Mar. 1, 2018

(65) Prior Publication Data
US 2019/0201742 A1 Jul. 4, 2019

(30) Foreign Application Priority Data

Aug. 24, 2016 (DE) .......................... 102016010511.9
Aug. 24, 2016 (DE) .......................... 202016005316.8

(51) Int. Cl.
*A63B 23/16* (2006.01)
*G09B 15/06* (2006.01)
(Continued)

(52) U.S. Cl.
CPC .............. *A63B 23/16* (2013.01); *A63B 23/12* (2013.01); *G09B 15/06* (2013.01); *A63B 2071/0694* (2013.01)

(58) Field of Classification Search
CPC ......... A63B 23/16; A63B 23/12; A63B 23/14; A63B 29/08; A63B 2244/14;
(Continued)

(56) References Cited

U.S. PATENT DOCUMENTS 3,594,945 A * 7/1971 Turney .................... A63H 33/18
446/48
4,730,827 A * 3/1988 Williams ............... A63B 23/16
482/122
(Continued)

FOREIGN PATENT DOCUMENTS

CN 204990838 U 1/2016

OTHER PUBLICATIONS

R Wiltfong:"Wayback Machine", May 3, 2016 (May 3, 2016), pp. 1-1, XP055436127, Retrieved from the Internet: URL: https://web.archive.org/web/20160503022553/http://www.beatriceco.com/bti/porticus/bell/images/removing_dial_wheel.gif [retrieved on Dec. 18, 2017] p. 1.

(Continued)

*Primary Examiner* — Megan Anderson
*Assistant Examiner* — Kathleen Vermillera
(74) *Attorney, Agent, or Firm* — Bayramoglu Law Offices LLC

(57) ABSTRACT

The invention relates to an exercise disc for strengthening the fingers of the hand, including a disc body with an upper disc surface on which the palm together with the fingers and the thumb can be placed, wherein receiving areas for a region of the fingertips and a region of the thumb tip are recessed in the upper disc surface. According to the invention: one disc body is provided for the left hand and one disc body is provided for the right hand; two neighbouring receiving areas are provided for each said region of the finger tips and said region of the thumb tip; and the respective finger and the thumb can move between the two receiving areas by abduction/adduction. Preferably, the receiving areas are in the form of blind slotted holes.

19 Claims, 2 Drawing Sheets

(51) Int. Cl.
*A63B 71/06* (2006.01)
*A63B 23/12* (2006.01)

(58) Field of Classification Search
CPC ..... A63B 2244/15; A63B 65/10; A63B 67/06; A63B 67/086; G09B 15/06; G09B 13/00; G09B 15/00; G09B 15/001; G09B 15/003; G09B 15/007; G09B 15/008; G09B 15/02; G09B 15/026
See application file for complete search history.

(56) References Cited

U.S. PATENT DOCUMENTS

| | | | | |
|---|---|---|---|---|
| 5,013,030 A | * | 5/1991 | Frins | A63B 23/16 482/47 |
| 5,076,569 A | * | 12/1991 | Gootter | A63B 23/16 482/49 |
| 5,807,183 A | * | 9/1998 | Benson | A63B 15/005 473/206 |
| 6,228,001 B1 | * | 5/2001 | Johnson | A63B 21/028 482/44 |
| 7,081,032 B1 | * | 7/2006 | Holgate | A63H 33/18 446/46 |
| 9,011,294 B2 | * | 4/2015 | Mylrea | A63B 21/0004 482/51 |
| 2006/0079380 A1 | * | 4/2006 | Wells | A63B 21/0023 482/49 |

OTHER PUBLICATIONS

Anonymous:"Die Wählscheibe für die Nummernwahl", Apr. 12, 2016 (Apr. 12, 2016), pp. 1-2, XP055436008, Retrieved from the Internet: URL: https://web.archive.org/web/20160412163856/http://bayern-online.com/v2261/artikel.cfm/203/die-waehlscheibe-fuer-die-nummernwahl.html [retrieved on Dec. 18, 2017] p. 1.

* cited by examiner

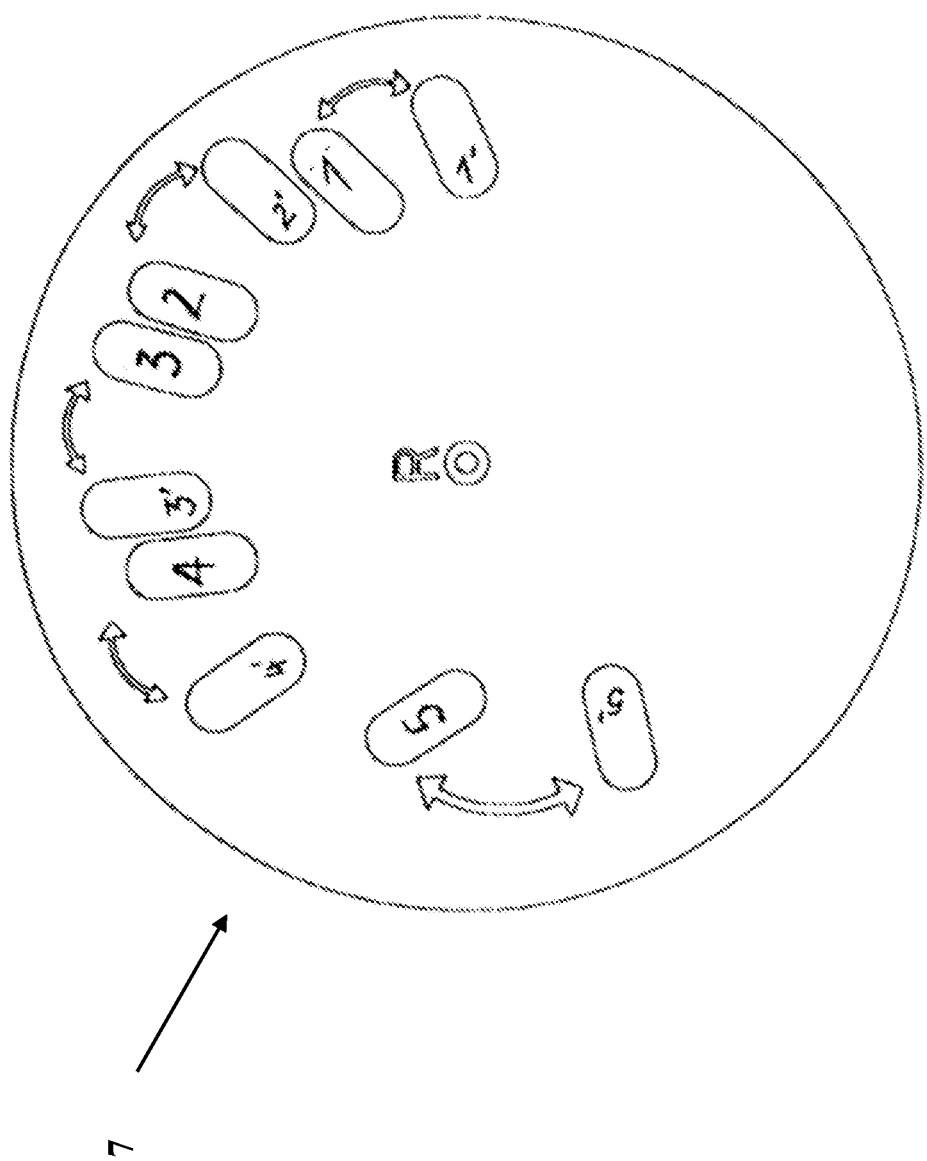

EXERCISE DISC FOR STRENGTHENING THE FINGERS

CROSS REFERENCE TO RELATED APPLICATIONS

This application is the national phase entry of International Application PCT/DE2017/000271, filed on Aug. 22, 2017 which is based upon and claims priority to German Patent Application No. DE 102016010511.9, filed on Aug. 24, 2016, and German Patent Application No. DE 202016005316.8, filed on Aug. 24, 2016, the entire contents of which are incorporated herein by reference.

TECHNICAL FIELD

The invention relates to an exercise disc for strengthening the fingers and for improving the finger dexterity with regard to a movement in the plane of the hand, and it serves for general health purposes, especially for finger training for musicians.

BACKGROUND

A finger force exercise disc for musicians is known from CN 204990838 U. This circular disc has three coaxially arranged rings, where the grooves between the rings have finger holes and two recesses for the right and left thumb.

The wrist is supported by a centrally raised area. During the training, the fingers are fixed in the finger holes with a part of the fingertip and prevented from a forward and backward movement by the groove walls, so that they move left and right under the influence of a force.

SUMMARY

It is the task of the invention to strengthen the fingers and to improve the finger dexterity with regard to a movement in the plane of the hand.

This task is solved by the features of claim 1. Optimized embodiments are the subject matter of the dependent claims.

For an exercise disc for strengthening the fingers of the hand, comprising a disc body with an upper disc surface on which the palm together with the fingers and a thumb can be placed, wherein receiving areas for a region of the fingertips and a region of the thumb tip are recessed in the upper disc surface, in accordance with the invention, one disc body may be provided for the left hand, and one disc body may be provided for the right hand; two neighboring receiving areas are provided for each said region of the finger tips and said region of the thumb tip; and the respective finger and the thumb can move freely between the two receiving areas by abduction/adduction.

Preferably, the disc bodies have a circular shape with a slightly convex upper disc surface, so that the palm with the fingers and the thumb can be supported comfortably by the disc surface.

In this case, the disc bodies can be formed independently of the palm size and/or the receiving areas can have such a length that they are suitable for different finger lengths. Therefore, receiving areas are preferred that have the form of blind slotted holes. The lengths and widths of these slots are designed in such a way that they can accept at least the length and width of the third knuckle of the respective finger and the second knuckle of the thumb, respectively.

The pairwise arrangement of the blind slotted holes for the respective finger or the thumb is preferably carried out in such a way that the center lines of the blind slotted holes for the respective finger and the center lines of the blind slotted holes for each thumb form an acute angle ($\alpha$). In this case, the intersection point of the center lines of the blind slotted holes for the respective finger and the center lines of the blind slotted holes for each thumb should be in the area of the respective finger or thumb metacarpophalangeal joint. Here, the metacarpophalangeal joint is between the metacarpal bones and the finger or thumb bones.

A further embodiment allows for the outer edges of the two adjacent receiving areas that face one another to be chamfered or bevel edge for the respective finger and the thumb. The change of the respective fingers and the thumb between the two receiving areas as a result of the abduction/adduction then doesn't take place by gliding over a sharp edge.

Preferably, the disc body is made of elastic plastic materials, especially ethylene-vinyl acetate (EVA).

In order not to get into the wrong receiving area when changing between the respective finger and the thumb, there are arrows on the upper disc surface that mark the change of the respective finger or the thumb between the two correct receiving areas.

BRIEF DESCRIPTION OF THE DRAWINGS

FIG. 2 shows the disc body for the right hand according to another embodiment of the present invention.

Figure 1:
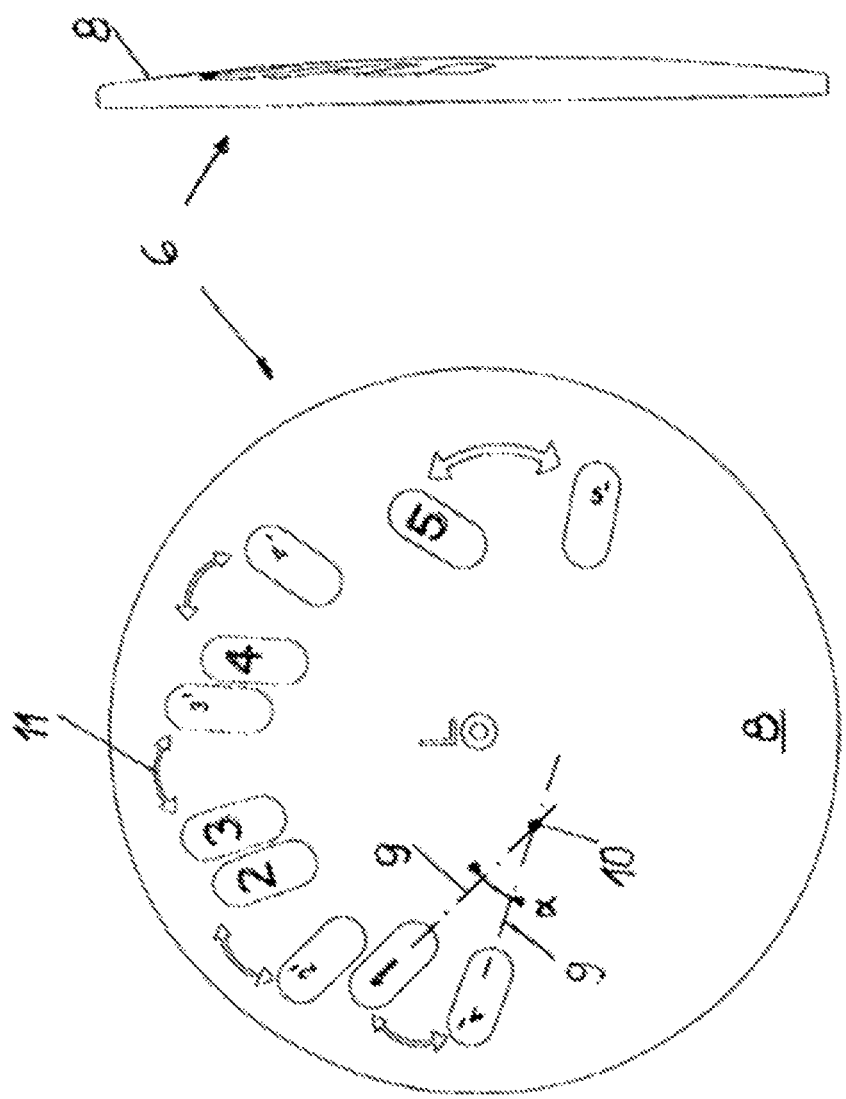
FIG. 1 shows a disc body for the left hand according to an embodiment of the present invention.

| | |
|---|---|
| 1,1' | Receiving area for a region of the finger tip of the little finger |
| 2,2' | Receiving area for a region of the finger tip of the ring finger |
| 3,3' | Receiving area for a region of the finger tip of the middle finger |
| 4,4' | Receiving area for a region of the finger tip of the index finger |
| 5,5' | Receiving area for a region of the thumb |
| 6 | Disc body |
| 7 | Disc body |
| 8 | Upper disc surface |
| 9 | Center line of the blind slotted holes |
| 10 | Area of the finger or the thumb metacarpophalangeal joint |
| 11 | Arrows as marks |

DETAILED DESCRIPTIONS OF THE EMBODIMENTS

The invention is explained in greater detail by means of the illustrations. Here, FIG. 1 shows a disc body 6 for the left hand, and FIG. 2 shows the disc body 7 for the right hand. The setup is a mirror image, so that only the setup for the left hand is explained.

The exercise disc for strengthening the fingers of the left hand has a disc body 6 with a slightly convex upper disc surface 8 on which the palm with the fingers and the thumb can be placed. Preferably, the disc diameter is between 24 and 26 cm.

Two pairwise and adjacent receiving areas for the fingers and the thumb are in the upper disc surface 8:

| | |
|---|---|
| 1, 1' | Receiving area for a region of the finger tip of the little finger, |
| 2, 2' | Receiving area for a region of the finger tip of the ring finger, |
| 3, 3' | Receiving area for a region of the finger tip of the middle finger, |
| 4, 4' | Receiving area for a region of the finger tip of the index finger, |
| 5, 5' | Receiving area for a region of the thumb. |

The receiving areas 1-1'-5-5' have the form of blind slotted holes, whose lengths and widths are designed in such a way that they can accept at least the length and width of the third knuckle of the respective finger and the second knuckle of the thumb, respectively.

The pairwise arrangement of the receiving area 1-1'-5-5' for the respective finger or the thumb is preferably carried out in such a way that the center lines 9 of the blind slotted holes for the respective finger and the center lines 9 of the blind slotted holes for each thumb form an acute angle ($\alpha$). The intersection point of the center lines of the blind slotted holes for the respective finger and the center lines of the blind slotted holes for each thumb should be in the area 10 of the respective finger or thumb metacarpophalangeal joint. FIG. 1 shows this using the example of the two receiving areas 1-1' for the little finger.

The receiving areas 1-5 follow the natural finger and thumb position.

The outer edges of the two adjacent receiving areas 1-1'-5-5' that face one another are designed to be chamfered or bevel edge for the respective finger and the thumb.

The mode of operation is as follows: The left hand is placed on the upper disc surface 8, where the respective third knuckle and the second thumb knuckle are placed in the respective receiving area 1-5 in a natural way. Then, proceeding in a time sequence and using one's own lateral muscle power, pressure is exerted onto the finger or the thumb so that the third knuckle of the finger and the second knuckle of the thumb is pressed over the respective outer edge of the respective receiving area 1-5 and then glides on the upper disc surface 8 to the corresponding second receiving area 1'-5'. After that, the reverse movement from the respective receiving areas 1'-5' to the receiving areas 1-5 takes place.

This change trains the fingers and the thumb to make them stronger and to increase their dexterity. The arrows 11 help the trainee find the correct direction.

What is claimed is:

1. An exercise disc for strengthening fingers of a hand, comprising a disc body with an upper disc surface,
   wherein the upper disc surface is configured for placement of a palm of the hand and comprises a first set of five receiving areas configured for simultaneous placement of respective fingertips of a little finger, a ring finger, a middle finger, an index finger and a thumb of the hand,
   wherein the respective receiving areas configured for the fingertips of the ring finger and the middle finger of the first set of five receiving areas are spaced closer together than the respective receiving areas configured for the little finger and the ring finger or the middle finger and the index finger or the index finger and the thumb of the first set of five receiving areas,
   wherein the exercise disc is configured to accommodate movement of each of the four fingers and the thumb of the hand between the first set of five receiving areas to a second set of five receiving areas on the upper disc surface, and
   wherein the exercise disc is configured to allow the finger tips to move freely between the first set of five receiving areas and the second set of five receiving areas on the upper disc surface.

2. The exercise disc of claim 1, wherein each receiving area of the first set of five receiving areas and the second set of the five receiving areas has a form of a blind slotted hole having a longitudinal axis, the longitudinal axis forming a center line.

3. The exercise disc of claim 2, wherein the center line for each of the first set of five receiving areas forms an acute angle relative to a corresponding adjacent center line for each of the second set of five receiving areas.

4. The exercise disc of claim 3, wherein each receiving area for each of the four fingers of the first set of five receiving areas and the second set of five receiving areas is configured to receive at least a length and a width of a third knuckle of the respective finger and the receiving area for the thumb of the first set of five receiving areas and the second set of five receiving areas is configured to receive a length and a width of a second knuckle of the thumb.

5. The exercise disc of claim 3, wherein outer edges facing one another of each receiving area of the first set of five receiving areas and the second set of five receiving areas are chamfered or bevel edges.

6. The exercise disc of claim 2, wherein an intersection point of the center lines between each receiving area of the first set of five receiving areas and a corresponding adjacent receiving area of the second set of five receiving areas for each of the four fingers is configured to be located in an area of a respective finger metacarpophalangeal joint, and an intersection point of the center lines between the receiving area of the first set of five receiving areas and a corresponding adjacent receiving area of the second set of five receiving areas for the thumb is configured to be located in an area of a thumb metacarpophalangeal joint.

7. The exercise disc of claim 6, wherein each receiving area for each of the four fingers of the first set of five receiving areas and the second set of five receiving areas is configured to receive at least a length and a width of a third knuckle of the respective finger and the receiving area for the thumb of the first set of five receiving areas and the second set of five receiving areas is configured to receive a length and a width of a second knuckle of the thumb.

8. The exercise disc of claim 6, wherein outer edges facing one another of each receiving area of the first set of five receiving areas and the second set of five receiving areas are chamfered or bevel edges.

9. The exercise disc of claim 2, wherein each receiving area for each of the four fingers of the first set of five receiving areas and the second set of five receiving areas is configured to receive at least a length and a width of a third knuckle of the respective finger and the receiving area for the thumb of the first set of five receiving areas and the second set of five receiving areas is configured to receive a length and a width of a second knuckle of the thumb.

10. The exercise disc of claim 2, wherein outer edges facing one another of each receiving area of the first set of five receiving areas and the second set of five receiving areas are chamfered or bevel edges.

11. The exercise disc of claim 2, wherein the disc body is made of an elastic plastic material.

12. The exercise disc of claim 1, wherein each receiving area for each of the four fingers of the first set of five receiving areas and the second set of five receiving areas is configured to receive at least a length and a width of a third knuckle of the respective finger and the receiving area for the thumb of the first set of five receiving areas and the second set of five receiving areas is configured to receive a length and a width of a second knuckle of the thumb.

13. The exercise disc of claim 12, wherein outer edges facing one another of each receiving area of the first set of five receiving areas and the second set of five receiving areas are chamfered or bevel edges.

14. The exercise disc of claim 1, wherein the disc body is made of an elastic plastic material.

15. The exercise disc of claim 14, wherein the elastic plastic material is EVA.

16. The exercise disc of claim 1, wherein outer edges facing one another of each receiving area of the first set of five receiving areas and the second set of five receiving areas are chamfered or bevel edges.

17. The exercise disc of claim 1, wherein the disc body has a shape of a circle.

18. The exercise disc of claim 1, wherein the upper disc surface is a slightly convex curve.

19. The exercise disc of claim 1, wherein arrows are provided on the upper disc surface and configured to mark the movement of each of the four fingers or the movement of the thumb between the first set of five receiving areas and the second set of five receiving areas.

* * * * *